United States Patent [19]

Akers

[11] E Re. 30,625

[45] Reissued May 26, 1981

[54] SAFETY CAP AND CONTAINER

[76] Inventor: Edward G. Akers, 647 Briarfield, Pecan Plantation, Granbury, Tex. 76048

[21] Appl. No.: 955,708

[22] Filed: Oct. 30, 1978

Related U.S. Patent Documents

Reissue of:

[64] Patent No.: 3,880,313
Issued: Apr. 29, 1975
Appl. No.: 710,032
Filed: Mar. 4, 1968

U.S. Applications:

[63] Continuation of Ser. No. 790,681, Apr. 25, 1977, abandoned.

[51] Int. Cl.[3] ..... B65D 55/02

[52] U.S. Cl. ..... 215/211; 215/222

[58] Field of Search ..... 215/211, 222, 223, 214; 220/301

[56] References Cited

U.S. PATENT DOCUMENTS

| | | | |
|---|---|---|---|
| 1,898,342 | 2/1933 | Cuthbert | 215/329 |
| 2,776,066 | 1/1957 | Thornton | 215/217 |
| 3,344,942 | 10/1967 | Hedgewick | 215/222 |
| 3,348,717 | 10/1967 | Treanor | 215/222 |
| 3,432,065 | 3/1969 | Bugla | 220/301 |
| 3,435,975 | 4/1969 | Weigand | 215/214 |

FOREIGN PATENT DOCUMENTS 665233 6/1963 Canada .

*Primary Examiner*—Donald F. Norton
*Attorney, Agent, or Firm*—Peter J. Murphy

[57] ABSTRACT

A safety cap and container is disclosed which is resistant to accidental opening. Such a cap and container include cooperating ratchet means on the cap and the container which normally hold the cap against undesired movement with respect to the container. A tapered internal surface is provided in the container and an internal resilient dependent member is provided on the cap so as to engage the tapered surface. Such engagement normally holds the ratchet means so that the cap cannot be moved with respect to the container. When, however, pressure is applied to the cap above the dependent member, this member is deflected by the tapered surface so as to allow movement of the cap so as to disengage the ratchet means, permitting the cap to be removed from the container.

13 Claims, 6 Drawing Figures

SAFETY CAP AND CONTAINER

Matter enclosed in heavy brackets [ ] appears in the original patent but forms no part of this reissue specification; matter printed in italics indicates the additions made by reissue.

*This application is a continuation of Reissue application Ser. No. 790,681, filed April 25, 1977 and now abandoned.*

BACKGROUND OF THE INVENTION

The problem of children and others inadvertently opening containers for various items such as various dangerous drugs has often been discussed. However, comparatively little has been done in providing safety caps and containers resistant to undesired or accidental opening.

Such structures as are known for this purpose are considered to be disadvantageous from a commercial standpoint for any one of a variety of different reasons. It is considered that such structures are comparatively difficult to manufacture at a nominal cost using present relatively high speed inexpensive injection molding techniques because of their construction. It is also considered that such structures are disadvantageous because they do not tend to adequately seal a container and because they normally are constructed in such a manner that they may trap dirt and other contaminates. With certain materials, such as some drugs, the danger of air contact such as might cause contamination or deterioration must be minimized to the greatest reasonable possible extent.

SUMMARY OF THE INVENTION

It is an object of this invention to overcome the various problems, difficulties and limitations encountered with prior related safety caps and containers such as are indicated briefly in the foregoing discussion. Another object of this invention is to provide safety caps and containers which may be manufactured at a comparatively low cost with only nominal difficulty using present day injection molding techniques. A further object of this invention is to provide safety caps and containers which may be constructed so as to adequately and satisfactorily seal the contents within such a combined structure against contamination.

A still further object of this invention is to provide safety caps and containers which have a "clean-cut" appearance and which do not contain openings or depressions which are apt to gather dirt or other contamination. Various other related objectives of this invention will be apparent from a detailed consideration of the remainder of this specification and the accompanying drawing.

The various objectives of this invention are achieved in a safety cap and container which is resistant to accidental opening because of the construction of both the cap and the container. Both the cap and the container include cooperating ratchet means which normally prevent the cap and the container from being moved with respect to one another when the cap is in operative position. The extremity of the container normally closed by the cap is provided with an adjacent tapered surface which is adapted to be engaged by a resilient dependent member. A plurality of such members can be used although this is considered disadvantageous. Normally this dependent member resiliently engages the tapered surface on the container when the cap is in the closed position so as to hold the cap in such a manner that the ratchet means are engaged. Preferably such a dependent member will during such holding serve to form a satisfactory type of seal for most purposes with the container.

The construction of the dependent member and the tapered surface is such that when pressure is applied to the cap above the dependent member, this member is deflected by the tapered surface, moving the cap to a position in which the ratchet means are disengaged and in which the cap may be turned so as to be removed from the container. In relocating the cap upon the container the reverse of the various steps indicated are of course repeated.

BRIEF DESCRIPTION OF THE DRAWING

The actual details of a safety cap and container of this invention are best described with reference to the accompanying drawing in which.

DESCRIPTION OF THE PREFERRED EMBODIMENT

Figure 1:
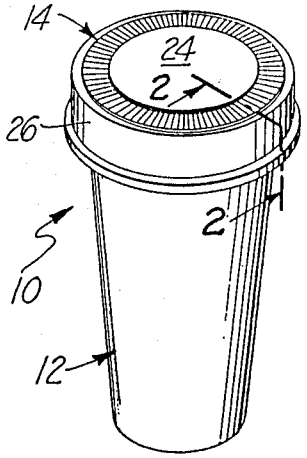
FIG. 1 is an isometric view of a presently preferred embodiment or form of a safety cap and container of this invention.

The safety cap and container 10 illustrated in the drawing includes a container 12 and a cap 14. Both of these parts (12 and 14) may conveniently be manufactured out of various commonplace polymers or plastics such as are commonly used in the manufacture of various other related containers and closures. It is preferred that the container 12 be manufactured out of a comparatively rigid material. If desired, this container 12 can be manufactured of glass or various other similar materials. It is preferred to manufacture the cap 14 as an entire unit out of a somewhat resilient material such as various grades of polyethylene in order to achieve the desired operation of the complete safety cap and container 10.

In the embodiment shown the container 12 has essentially a glass tumbler-like shape so that containers 12 can be nested in one another for shipment, storage and the like. This container 12 has a top opening 16 and a wall 18 surrounding the top opening. It also has adjacent to the top opening 16 a tapered internal surface 20 which is tapered so as to have its largest dimension generally away from the interior of the container 12. In the embodiment illustrated this surface has the shape of a frustrum of a right circular cone. The wall 18 carries a plurality of ratchet lugs 22 which are equally spaced around the exterior of the wall 18.

The cap 14 has a disc-like top 24 which carries at its edge a peripheral generally cylindrical skirt 26. This top 24 also carries within the skirt 26 on its under surface a resilient dependent member 28. In the embodiment of the invention shown this dependent member 28 normally has essentially the shape of a hollow, continuous and imperforate, cylindrical wall. This is considered to be important in connection with the cap 14 being such a nature that it may be easily molded by injection-molding techniques. When, as in the preferred embodiment, the entire cap 14 is formed as one piece, the desired resiliency of the dependent member 28 is achieved by making this member 28 sufficiently thin so that it is capable of being temporarily deformed inwardly during the operation of the complete cap and container 10.

The interior of the skirt 26 is provided with a series of equally spaced ratchet stops 30. It is also provided with a plurality of vertically extending projections 32 which are spaced adjacent to each of these ratchet stops 30. In the construction shown there is one of the ratchet stops 30 and one of the projections 32 for each of the ratchet lugs 22.

The cap 14 is formed in this manner so that it may be secured to the container 12 by being located over the top opening 16 so that the wall 18 is surrounded by the skirt 26. When so located, the dependent member 28 will engage the tapered surface 20 adjacent to its largest diameter so as to prevent direct engagement between the stops 30 and the lugs 22. When these lugs 22 are positioned with the cap 14 in place over the container 12 so as to be offset with respect to the stops 30 and the projections 32 pressure may be applied to the periphery of the cap 14 as by pushing with the cupped palm of the hand so as to force the cap 14 towards the container 12.

Figure 3:
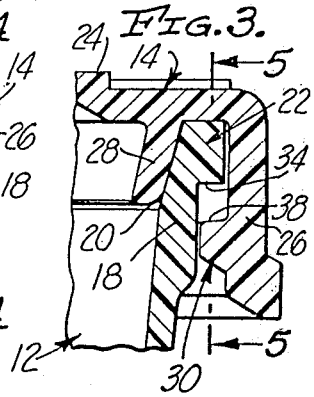
FIG. 3 is a partial cross-sectional view corresponding to FIG. 2 illustrating the configuration of certain parts during the removal of the cap from or the placement of the cap on the container in the illustrated preferred embodiment.
Figure 5:
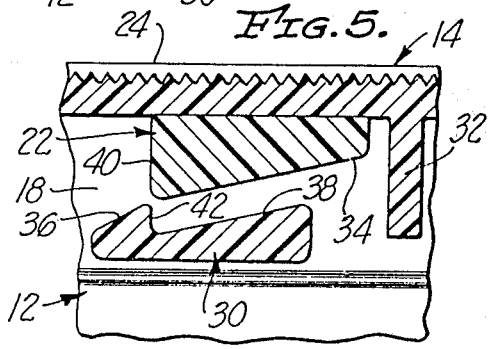
FIG. 5 is a partial cross-sectional view taken at line 5—5 of FIG. 3.

This will cause internal deflection of the dependent member 28 because of the sloped character of the surface 20 until such time as this member 28 assumes a position as indicated in FIG. 3 of the drawing. At this time the cap 14 may be secured to the container 12 by relative rotation between these two parts so as to slide a sloping surface 34 on each of the ratchet lugs 22 past a corresponding sloping surface 36 on one of the ratchet stops 30 until such time as each of the lugs 22 is positioned opposite one of the stops 30 as illustrated in FIG. 5. The slopes on these surfaces 34 and 36 facilitate this movement in case insufficient pressure to completely deflect the member 28 may have been applied to the cap 14. The projections 32 by engagement with the lugs 22 prevent the cap 14 from being turned past a position as indicated in FIG. 5.

Figure 2:
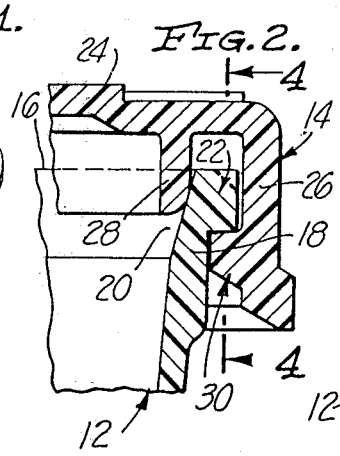
FIG. 2 is a partial cross-sectional view taken at line 2—2 of FIG. 1.

When the cap 14 has been located in position as indicated by FIG. 5, it may be released so as to allow the cap 14 to be located in a secured position as indicated in FIG. 2. The cap 14 will automatically tend to assume such a position because of the spring-like tendency of the dependent member 28 to return to its initial position, exerting pressure along the tapered surface 20, this pressure resulting in the cap 14 moving upwardly generally away from the container 12.

Figure 4:
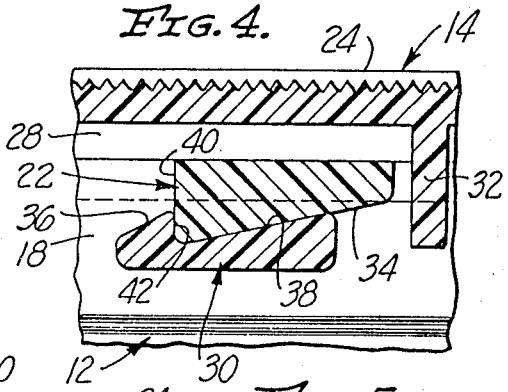
FIG. 4 is a partial cross-sectional view taken at line 4—4 of FIG. 2.
Figure 6:
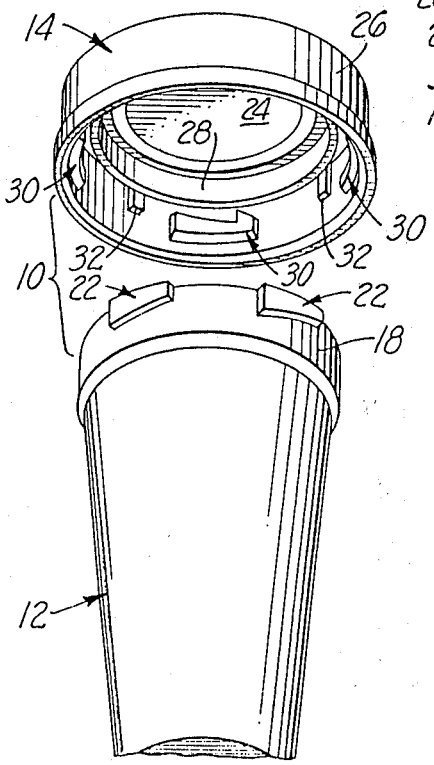
FIG. 6 is an exploded view showing part of the internal construction of the cap and part of the external construction of the container illustrated in the preceding figures.

When the cap 14 assumes such a "secured" position as indicated in FIGS. 2 and 4, the surface 34 on each of the lugs 22 will rest against another sloping surface 38 in one of the stops 30. In this position a vertically extending wall 40 in each of the lugs 22 is engaged with another corresponding wall 42 on a stop 30. In essence, the walls 38 and 42 on the stops 30 define notches which hold the lugs 22 when the cap 14 is spaced from the container 12 by the action of the dependent member 28.

With this construction the cap 14 once secured in place as described may only be removed by again applying pressure in the manner indicated so as to cause deformation of the member 28 by contact with the tapered surface 20. When such deformation has occurred, the lugs 22 and the stops 30 are spaced as shown in FIG. 5. At this point the cap 14 can only be rotated so that the lugs 22 are moved away from the projections 32 and the stops 30. When such rotation has occurred the cap 14 may be simply lifted off of the container 12.

From a careful consideration of the preceding, it will be realized that the continuous and imperforate member 28 normally engages the tapered surface 20 so as to effectively form a seal against contaminants such as dust, air or the like, when the cap 14 is in a secured position with respect to the container 12. It will also be realized that the function of the member 28, apart from the sealing function, can be achieved by making this particular member discontinuous or in effect making this member 28 so that it is divided up into a plurality of separate segmental members. It will be further realized that the particular surface 28 may be located outside of the wall 18 above the lugs 22. This latter is not preferred since it tends to make the complete structure comparatively large and tends to require the use of a longer skirt than is otherwise needed.

In a similar manner the lugs 22 and stops 30 may be modified in accordance with routine skill of the art. These two types of parts employed with the invention function essentially as cooperating ratchet parts or means preventing undesired movement of the cap 14 with respect to the container 12. Other equivalent ratchet means can be employed. Such ratchet means are effective in conjunction with other parts including a tapered surface 20 and a member 28 regardless of whether or not in a particular structure the cap 14 is moved linearly with respect to a container or is rotated with respect to such container as in the preferred embodiment 10.

From this it will be apparent that the invention herein described essentially involves the operative elements or parts indicated in FIGS. 2–5 of the drawing and may be embodied in different types or different appearing safety caps and containers.

I claim:

1. A safety package comprising:

a container having a mouth portion with an annular rim;

a one-piece cap having a base with a peripheral flange projecting axially therefrom for receiving said mouth portion;

interengageable locking elements on the outer wall of the mouth of the container and inner wall of the flange of the cap, the cap locking elements being spaced peripherally from each other and engageable with and disengageable from the container locking elements by combined axial and rotative motion of the cap relative to the container;

a resilient flexible member formed on the base of the cap having an inner annular end joined integrally to the base of the cap and extending axially therefrom and terminating in an outer annular free end, said inner annular end at the juncture with the base having a diameter at least as large as that of the outer annular free end;

said outer annular free end being engageable with the container to exert a biasing force in an axial direction between the cap and container when the locking elements are engaged.

2. A safety package as claimed in claim 1 wherein:

said container has an internal sloping surface adjacent to said mouth portion and said outer annular free end engages said sloping surface so as to exert said biasing force when the locking elements are engaged.

3. A safety package as claimed in claim 1 wherein:

said container has an internal conical surface adjacent to said mouth portion and said outer annular end engages said conical surface to exert said biasing force when the locking elements are engaged.

4. A safety package as claimed in claim 1 wherein:

said container has an internal conical surface adjacent to said mouth portion, said outer annular end has a cylindrical shape prior to engagement with the container, and said outer annular end engages said conical surface and is deflected inwardly thereby to exert said biasing force when the locking elements are engaged.

5. A safety package as claimed in claim 3 wherein:

said resilient flexible member comprises a continuous, imperforate wall including said outer annular end;

and said outer annular end forms a seal with said conical surface whereby said cap tightly seals said container against contaminants when said locking elements are engaged.

6. A safety package as claimed in claim 1 wherein:

said resilient flexible member is a thin-walled, hollow cylinder.

7. A safety package as claimed in claim 6 wherein:

said container has an internal conical surface adjacent to said mouth portion;

said hollow cylinder is imperforate, and said annular outer end forms a seal with said conical surface whereby said cap tightly seals said container against contaminants when said locking elements are engaged.

8. A safety package comprising:

a container having a mouth portion with an annular rim, and having an internal conical surface adjacent to said mouth portion;

a cap having a base with a peripheral flange projecting axially therefrom for receiving said mouth portion;

interengageable locking elements on the outer wall of the mouth of the container and inner wall of the flange of the cap, the cap locking elements being spaced peripherally from each other and engageable with and disengageable from the container locking elements by combined axial and rotative motion of the cap relative to the container;

a resilient flexible member joined to the base of the cap, having a hollow, imperforate, annular wall extending axially therefrom and terminating in an outer annular free end; the inner end of said annular wall at the juncture with the base having a diameter at least as large as that of the outer annular free end;

said outer annular end being engageable with said conical surface to exert a biasing force in an axial direction between the cap and container when the locking elements are engaged;

and said outer annular end engaging said conical surface in sealing relation when the locking elements are engaged, whereby said cap defines an effective liquid tight and airtight seal with the mouth of said container.

9. A safety package as claimed in claim 8 wherein:

said annular wall is dimensioned that said outer annular end is deflected inwardly by said conical surface, when said locking elements are engaged, to exert said biasing force and to effect said sealing.

*10. A safety package comprising:*

*a container having a mouth portion with an annular rim, and having an internal annular sloping surface adjacent to said mouth portion;*

*a one piece cap having a base with a peripheral flange projecting axially therefrom for receiving said mouth portion;*

*interengageable locking elements on the outer wall of said container mouth portion and on the inner wall of said cap flange, the cap locking elements being spaced peripherally from each other and engageable with and disengageable from the container locking elements by combined axial and rotative motion of the cap relative to the container;*

*a member joined to said cap base, providing a resilient, flexible, annular wall extending generally axially therefrom and terminating in an outer annular free end; the inner end of said annular wall being joined integrally to said cap base; said outer annular free end being engageable with said container sloping surface and being deflected radially inward thereby, to exert a biasing force in an axial direction between said cap base and said container effective to maintain said locking elements engaged; and said annular free end of said annular wall being the only portion of said cap engaging said container to exert said axial biasing force.*

*11. A safety package as claimed in claim 10*

*said annular wall of said member being a continuous, imperforate annular wall; said member and cap defining a sealing closure for the container mouth;*

*and said outer annular end of said annular wall engaging said sloping surface in sealing relation, when said locking elements are engaged, whereby said cap defines an effective liquid tight and airtight seal with the mouth of said container.*

*12. A safety package as claimed in claim 10*

*said outer annular end having a generally cylindrical shape prior to engagement with said container.*

*13. A safety package as claimed in claim 10*

*said member comprising a generally cylindrical, thin walled member.*

* * * * *